Aug. 11, 1931.   J. E. WHITAKER   1,818,514
ELECTRICIAN'S BELT CLIP TAPE REEL
Filed Aug. 1, 1928
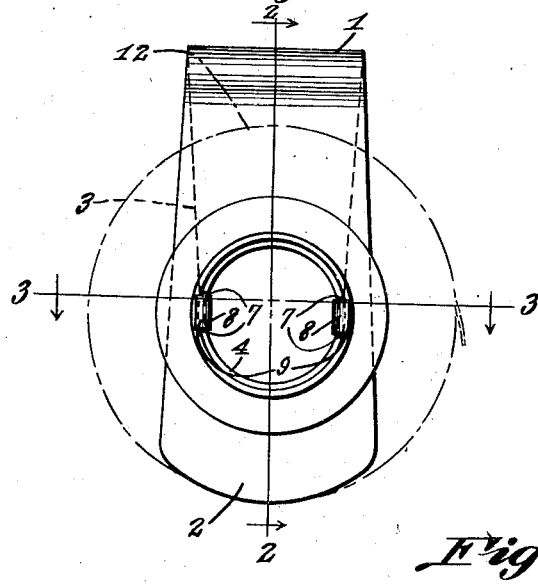
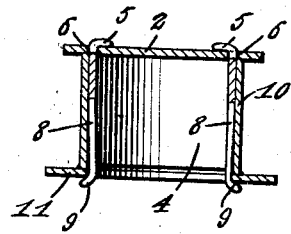
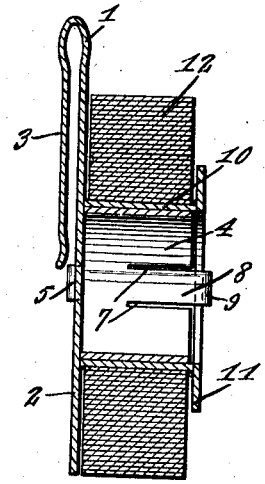
J. E. Whitaker, Inventor
By C. A. Snow & Co.
Attorneys.

Patented Aug. 11, 1931

1,818,514

UNITED STATES PATENT OFFICE

JOHN EDWARD WHITAKER, OF WEST MONROE, LOUISIANA

ELECTRICIAN'S BELT CLIP TAPE REEL

Application filed August 1, 1928. Serial No. 296,726.

This invention aims to provide a novel means whereby an electrician or other workman can carry, conveniently and accessibly, a roll of material, such as adhesive tape, the construction being such that the roll of tape may be mounted in place without difficulty, upon its support.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in front elevation, a device constructed in accordance with the invention;

Figure 2 is a section on the line 2—2 of Figure 1;

Figure 3 is a section on the line 3—3 of Figure 1.

The device forming the subject matter of this application includes a support, in the form of a clip 1, made up of a plate-like body 2 and a resilient tongue 3 cooperating with the body to form a hook. A belt, the edge of a pocket, or any other thing of the like sort, can be engaged in the hook, between the tongue 3 and the body 2, and, thus, the device forming the subject matter of this application can be suspended conveniently from the body of the operator. A hollow shaft 4 is arranged at right angles to the body 2 of the support. At the rear end of the shaft 4 there are short projections 5 which are extended through holes 6 in the body 2 and riveted down on the back of the body, as shown in Figure 3, so as to hold the hollow shaft 4 in place on the body. As shown in Figure 2, the turned-over portions of the projections 5 are located at the free end of the tongue 3, and aid in holding a belt (not shown) in the hook formed by the members 1 and 3.

The hollow shaft 4 is slit lengthwise, at its outer end, as shown at 7, to form resilient latches 8 having outwardly extended fingers 9.

The device includes a tubular reel 10 having a disc like head 11 at its outer end, and in practical operation, the reel 10 is slipped inside of the roll 12 of tape, the reel being slid on the shaft 4. The latches 8 yield to permit the reel 10 to be slid on the shaft 4, and when the inner end of the reel is up against the body 2, the latches 8 will expand, and the fingers 9 will overlap the outer surface of the head 11 of the reel, to hold the reel in place on the hollow shaft 4. The roll 12 of tape is retained between the head 11 and the body 2, as shown in Figure 2, and any desired amount of tape can be peeled off the roll 12. If there is enough friction between the roll 12 and the reel 10, the reel will turn, with the roll of tape, on the shaft 4; but if the hole in the center of the roll of tape happens to be of considerable size so that there is not much friction between the roll and the reel 10, then the roll may rotate on the reel. In any event, the roll of tape can rotate and the strip of any desired length may be removed from the roll.

Having thus described the invention, what is claimed is:—

In a device of the class described, a support comprising a plate-like body provided with holes, and a tongue connected to the end of the body and cooperating with the body to form a belt-receiving hook; a hollow cylindrical shaft abutting at its inner end against the body and provided with projections extended through the holes and turned over to hold the shaft on the body, the turned-over portions of the projections being located at the free end of the tongue, to aid in holding a belt in the hook, and a tubular reel journaled on the shaft and provided at its outer end with a disk-like head, the shaft being longitudinally slit at its outer end, to form latches which lie in a common circumference with the wall of the tubular shaft and parallel to the axis of the shaft, thereby permitting the reel to rotate on the shaft, the latches being provided at their outer ends with oppositely-extended retaining fingers which overlap the head of the reel and hold the reel on the shaft rotatably.

In testimony that I claim the foregoing as my own, I have hereto affixed my signature.

JOHN EDWARD WHITAKER.